US012590868B2

(12) United States Patent
Hell

(10) Patent No.: US 12,590,868 B2
(45) Date of Patent: Mar. 31, 2026

(54) ADJUSTABLE TEST OBJECT HOLDER FOR A DRIVE TRAIN, TEST BENCH, AND DRIVE TRAIN TEST BENCH

(71) Applicant: ZF Friedrichshafen AG, Friedrichshafen (DE)

(72) Inventor: Christian Hell, Untergriesbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 591 days.

(21) Appl. No.: 18/013,168

(22) PCT Filed: Jun. 17, 2021

(86) PCT No.: PCT/EP2021/066433
§ 371 (c)(1),
(2) Date: Aug. 28, 2023

(87) PCT Pub. No.: WO2022/002614
PCT Pub. Date: Jan. 6, 2022

(65) Prior Publication Data
US 2024/0219262 A1      Jul. 4, 2024

(30) Foreign Application Priority Data
Jun. 29, 2020      (DE) ..................... 10 2020 208 040.2

(51) Int. Cl.
*G01M 13/027*          (2019.01)
*G01M 13/025*          (2019.01)

(52) U.S. Cl.
CPC ........ *G01M 13/027* (2013.01); *G01M 13/025* (2013.01)

(58) Field of Classification Search
CPC ......................... G01M 13/027; G01M 13/025
See application file for complete search history.

(56) References Cited

U.S. PATENT DOCUMENTS

| | | | |
|---|---|---|---|
| 3,834,221 A | 9/1974 | Swis et al. | |
| 3,903,737 A | 9/1975 | Burden et al. | |

(Continued)

FOREIGN PATENT DOCUMENTS

| | | |
|---|---|---|
| CN | 203798560 U | 8/2014 |
| CN | 107677468 A | 2/2018 |

(Continued)

OTHER PUBLICATIONS

"Combined Alternator End Frame and Engine Mounting Bracket", Research Disclosure, Kenneth Mason Publications, Hampshire, UK, GB, No. 304, p. 620 (Aug. 1, 1989).

(Continued)

*Primary Examiner* — Freddie Kirkland, III
(74) *Attorney, Agent, or Firm* — Finch & Maloney PLLC

(57) ABSTRACT
The invention relates to an adjustable test object holder (1) for a drive-train test bench (100) and a corresponding test bench. The test object holder (1) has a first surface (5) and a second surface (3) parallel to the first surface (5), where the test object holder (1) can be arranged on a subsurface via the first surface (5), and where a test object can be arranged on the second surface (3). The test object holder (1) is designed in such manner that relative to the first surface (2) the second surface (3) can be displaced along a longitudinal axis (X), a vertical axis (Z), and a transverse axis (Y). The test object holder (1) is further designed in such manner that relative to the first surface (5) the second surface (3) can be tilted at least about the vertical axis (Z) and the transverse axis (Y).

20 Claims, 3 Drawing Sheets

(56)          References Cited

U.S. PATENT DOCUMENTS

| | | | |
|---|---|---|---|
| 3,938,377 | A | 2/1976 | Converse, III et al. |
| 3,952,053 | A | 4/1976 | Brown, Jr. |
| 4,062,234 | A | 12/1977 | Bartlett, Jr. et al. |
| 4,511,112 | A | 4/1985 | Ruehle |
| 4,592,228 | A | 6/1986 | Lucia |
| 4,862,736 | A | 9/1989 | Treitz |
| 4,898,026 | A | 2/1990 | Damitz |
| 4,932,628 | A | 6/1990 | Pacheco |
| 5,851,007 | A | 12/1998 | Swartzlander et al. |
| 6,393,904 | B1 | 5/2002 | Krug et al. |
| 6,698,293 | B2 | 3/2004 | Reinisch et al. |
| 7,066,040 | B2 | 6/2006 | Bruggemann |
| 7,726,183 | B2 | 6/2010 | Erlach et al. |
| 9,234,816 | B2 * | 1/2016 | Jeon ..................... G01M 15/02 |
| 10,088,033 | B2 | 10/2018 | Thelen |
| 10,203,266 | B2 | 2/2019 | Teramoto et al. |
| 11,009,428 | B2 | 5/2021 | Hell et al. |
| 11,125,649 | B2 | 9/2021 | Hell et al. |
| 11,898,944 | B2 * | 2/2024 | Matsumoto ............. B06B 1/045 |
| 2002/0170344 | A1 | 11/2002 | Pallozzi |
| 2005/0044933 | A1 | 3/2005 | Laws |
| 2008/0126889 | A1 * | 5/2008 | Barnes .................. G01M 13/02 |
| | | | 714/704 |
| 2010/0107749 | A1 | 5/2010 | Gushman et al. |
| 2011/0308307 | A1 | 12/2011 | Schneider et al. |
| 2012/0042720 | A1 | 2/2012 | Bastian et al. |
| 2013/0055804 | A1 | 3/2013 | Preising et al. |
| 2015/0040654 | A1 | 2/2015 | Khateri |
| 2016/0282225 | A1 * | 9/2016 | Teramoto ............. G01M 13/04 |
| 2017/0010182 | A1 * | 1/2017 | Dudeck .................... B61L 5/06 |
| 2017/0328812 | A1 | 11/2017 | Zhang et al. |
| 2018/0299347 | A1 | 10/2018 | Frohler |
| 2019/0204185 | A1 | 7/2019 | Bosl |
| 2019/0331554 | A1 | 10/2019 | Hell et al. |
| 2019/0391042 | A1 | 12/2019 | Hell |

FOREIGN PATENT DOCUMENTS

| | | | |
|---|---|---|---|
| DE | 1 915 896 | A1 | 10/1970 |
| DE | 1 613 413 | A1 | 2/1972 |
| DE | 33 11 618 | A1 | 10/1984 |
| DE | 43 28 537 | A1 | 3/1995 |
| DE | 198 22 093 | A1 | 11/1999 |
| DE | 100 37 412 | A1 | 3/2002 |
| DE | 101 35 976 | A1 | 2/2003 |
| DE | 102 34 022 | A1 | 2/2004 |
| DE | 103 44 802 | A1 | 4/2005 |
| DE | 10 2007 040 106 | A1 | 2/2009 |
| DE | 10 2008 006 634 | A1 | 7/2009 |
| DE | 10 2008 062 181 | B3 | 4/2010 |
| DE | 10 2009 020 182 | A1 | 11/2010 |
| DE | 10 2010 055 573 | A1 | 6/2012 |
| DE | 10 2012 018 359 | A1 | 3/2013 |
| DE | 10 2012 007 576 | A1 | 10/2013 |
| DE | 10 2015 101 885 | A1 | 8/2016 |
| DE | 10 2018 127 572 | A1 | 5/2020 |
| EP | 2 957 885 | A1 | 12/2015 |
| GB | 2 327 817 | A | 2/1999 |
| WO | 2005/116604 | A1 | 12/2005 |
| WO | 2022002614 | A1 | 1/2022 |

OTHER PUBLICATIONS

Notification Concerning Submission, Obtention or Transmittal of Priority Document, for PCT/EP2021/066433, (Aug. 12, 2021).

First Notice Informing The Applicant of The Communication of the International Application (to designated offices which do not apply the 30 month time limit under article 22(1)), for PCT/EP2021/066433,(Feb. 3, 2022).

International Search Report and Written Opinion for PCT/EP2021/066433, (Oct. 3, 2021).

DE Search Report for DE App 10 2020 208 040.2 (Feb. 15, 2021).

* cited by examiner

ADJUSTABLE TEST OBJECT HOLDER FOR A DRIVE TRAIN, TEST BENCH, AND DRIVE TRAIN TEST BENCH

RELATED APPLICATIONS

This application claims the benefit under 35 U.S.C. § 371 as a U.S. National Phase Application of application no. PCT/EP2021/066433, filed on 17 Jun. 2021, which claims benefit of German Patent Application no. 10 2020 208 040.2 filed 29 Jun. 2020, the contents of which are hereby incorporated herein by reference in their entireties.

FIELD OF THE DISCLOSURE

The invention relates to an adjustable test object holder for a drive-train test bench and to a corresponding drive-train test bench.

BACKGROUND

Transmission test benches and drive-train test benches for the testing of motor vehicle transmissions or complete motor vehicle drive-trains are known from the prior art. Such test benches are usually used to detect functional defects in drive-trains at an early stage by means of a series of load tests. Furthermore, such test benches are also used in the development and continual improvement of motor vehicle drive-trains and, in particular, motor vehicle transmissions. As a general rule, known test benches are designed for the testing of motor vehicle drive-trains powered by combustion engines.

The test benches suitable for testing combustion-engine-powered motor vehicle drive-trains are typically not suitable for the testing of electric drive-trains, since electric drive-trains are driven at much higher rotation speeds of more than 10,000 rev/min. There are therefore special requirements as regards rigidity and vibration damping in drive-train test benches for electric motor vehicle drive systems. Furthermore, owing to the high rotation speeds involved, electric drive-trains have to be very precisely orientated on the test bench.

In this connection DE 10 2016 224 142 A1 describes a drive-train test bench that can be built up in modules for electric motor vehicle drive systems, which is designed to be particularly rigid and vibration-damping. At the same time, it allows the transmission to be orientated precisely relative to a drive unit of the test bench.

SUMMARY

However, the known test benches for electric motor vehicle drive-trains have the drawback that they have to be adjusted precisely for the particular drive-trains to be tested, which is very time-consuming.

A purpose of the present invention is to propose an improved test object holder for a drive-train test bench.

According to the invention this objective is achieved by the adjustable test object holder for a drive-train test bench specified in claim 1. Advantageous design features are described in the subordinate claims.

The invention relates to an adjustable test object holder for a drive-train test bench, wherein the test object holder has a first surface and a second surface parallel to the first surface, wherein the test object holder can be arranged on a subsurface by way of the first surface, wherein a test object can be arranged on the second surface and wherein the test object holder is designed in such manner that the second surface can be adjusted relative to the first surface along a longitudinal axis, a vertical axis and a transverse axis. The distinguishing feature of the test object holder according to the invention is that the test object holder is also designed in such manner that the second surface can be tilted relative to the first surface at least about the vertical axis and the transverse axis.

Thus, a test object holder is proposed which, as part of a drive-train test bench, is suitable for holding a test object. The test object is preferably a vehicle transmission, in particular a vehicle transmission for an electrically powered vehicle. Such a vehicle transmission for an electrically powered vehicle differs from a vehicle transmission for a combustion-engine-driven vehicles, above all, by being designed for much higher input rotation speeds of more than 10,000 r/min. In addition, as a general rule a vehicle transmission for an electrically powered vehicle has comparatively fewer shiftable gears. However, the test object can comprise not only just the vehicle transmission but also, for example, the vehicle transmission to which are connected driveshafts and distribution gear systems, right down to the individual wheel driveshafts. Likewise, it is conceivable and preferable for the test object to comprise exclusively an electric drive motor for an electrically powered vehicle. In that case the electric drive motor can undergo a so-termed "back-to-back" test, i.e. a load test in which the electric drive motor for the electrically powered vehicle is coupled directly to a drive unit of the drive-train test bench. The drive unit of the drive-train test bench is in particular also an electric motor. Since a clutch is advantageously used as the coupling between the test object and the drive unit of the drive-train test bench, it is necessary to align the test object as exactly as possible relative to the drive unit. A clutch is advantageously suitable for the transmission of high rotation speeds of the type usual in electric drive-trains, but it demands that the axles to be coupled should have no offset at all. According to the invention, to ensure this exact-as-possible alignment, in addition to the adjustability of the second surface relative to the first surface along the longitudinal, vertical and transverse axes the second surface can also be tilted relative to the first surface about the vertical axis and the transverse axis. In that way the most optimum possible alignment of the test object can be ensured reliably and in a simple manner. In particular, the occurrence of undesired vibrations due to imperfect alignment can be avoided.

The first surface and the second surface of the test object holder are preferably made of metal and are essentially flat. They can have slots or openings, or even cut-outs with larger areas. The first surface forms an underside of the test object holder, onto which the test object holder can be placed. Slots or openings in the first surface are advantageously provided in order to enable fastening of the test object holder to a base. A cut-out with a comparatively large area is also to be preferred, for example in order to reduce weight. The second surface forms an upper side of the test object holder, on which the test object can be arranged. Advantageously, by virtue of slots or openings in the second surface a plurality of holding means, in particular four holding means can be provided in order to clamp the test object in position. The first and second surfaces are preferably rectangular.

The longitudinal, vertical and transverse axes are three mutually perpendicular axes, with the longitudinal axis defining a direction parallel to the longest edge of the first surface, the transverse axis defining a direction parallel to the short edge of the first surface, while the vertical axis is perpendicular to the first surface.

According to a preferred embodiment of the invention, it is provided that relative to the first surface the second surface can be adjusted along the vertical axis by means of at least two displaceable wedges. The at least two wedges are in this case preferably of identical design. They have a triangular cross-section and have two long side-edges and one short side-edge. First of all, this has the advantage that the first surface and the second surface are connected to one another via the at least two wedges, since the first surface rests in each case against one of the long side-edges of each wedge and the second surface rests against the other long side-edge of the wedges. By virtue of the comparatively large contact areas produced in that way, the first surface and the second surface are connected in a vibration-damping and rigid manner.

In this case, each wedge can be moved along the first surface or the second surface by means of a threaded spindle, in particular along a slope of the first or second surface, so that depending on the position of the wedges the first surface is displaced relative to the second surface along the vertical axis. Thus, in a very simple manner, by virtue of the displacement of the wedges the height of the second surface relative to the first surface can be adjusted comparatively finely. In particular, it is not necessary, as is often customary in the prior art, to adjust the desired height of the second surface relative to the first surface by means of bearing slats.

According to a further preferred embodiment of the invention, it is provided that the at least two wedges are arranged on a first intermediate plate, the said intermediate plate having in particular an inclined upper surface, which corresponds to an obliquity of the wedges in the opposite direction, in such manner that an underside of the first intermediate plate and in each case a long side-edge of the at least two wedges are parallel to one another. Making use of the first intermediate plate has the advantage that the adjustment or tilting abilities of the second surface relative to the first surface along other axes are not affected adversely.

In a further preferred embodiment of the invention, it is provided that the at least two displaceable wedges are arranged so that they cannot move relative to the first or relative to the second surface, whereas they can move relative to the respective other surface on inclined surfaces provided for the purpose, so that a displacement of the at least two wedges at the same time as an adjustment of the first surface along the vertical axis results in a movement of the first surface along the vertical axis and along the transverse axis or the longitudinal axis. Since the at least two wedges are positionally fixed either on the first or on the second surface, the first or second surface is correspondingly displaced along with the at least two wedges. The result is that by virtue of the displacement of the at least two wedges along the inclined surface, not only does a displacement along the vertical axis take place, but along the transverse or the longitudinal axis as well.

According to a further particularly preferred embodiment of the invention, it is provided that each of the at least two wedges has a convexity on its side-edge that faces toward the second surface, which extends over the side-edge. The convexity can be in the form of a circular arc in cross-section and can extend over the full length or part of the length of the side-edge of the wedge concerned. This has the advantage that the second surface is not connected via two surfaces in contact with one another, but rather, there is in each case only one line of contact along which the second surface is in contact with each of the at least two wedges. Likewise, it is conceivable that the convexity extends over the side-edge facing toward the wedge concerned with interruptions, and in particular the convexities can be ball segments. Thus, for example, slight tilting of the wedges that takes place when one or more wedges is/are displaced can be compensated in relation to the orientation of the second surface on the corresponding wedge.

According to a further particularly preferred embodiment of the invention, it is provided that a position of the at least two wedges can be determined by means of at least one depth caliper. Thus, the position of the at least two wedges can be determined in a simple manner. Since the displacement of the second surface relative to the first surface along the vertical axis is characterized by the position of the wedges, the height of the second surface above the first surface can in that way be determined simply.

Preferably, a depth caliper of its own is provided for each wedge.

In a further preferred embodiment of the invention, it is provided that relative to the first surface, the second surface can be moved along the longitudinal axis by means of a longitudinal spindle drive and along the transverse axis by means of a transverse spindle drive. Spindle drives allow a precise and reliable displacement of the second surface relative to the first surface. In this case the longitudinal spindle drive can for example be arranged between the first and second surfaces along the longitudinal axis, and the transverse spindle drive can for example be arranged between the first and second surfaces along the transverse axis.

According to a further preferred embodiment of the invention, it is provided that relative to the first surface, the second surface can be tilted about the transverse axis by means of at least one of the at least two wedges. For this purpose, only one of the at least two wedges is moved, or the at least two wedges are displaced by different amounts so that the wedges produce different distances between the first and second surfaces and the second surface is correspondingly inclined relative to the first surface. If the at least two wedges are arranged with a distance between them along the transverse axis and can be displaced, then the second surface can be tilted along the transverse axis.

In a further preferred embodiment of the invention, it is provided that relative to the first surface the second surface can be tilted around a bearing point about the vertical axis by means of a tilting spindle drive. The tilting spindle drive can in that case, for example, be arranged on a long end of the test object holder. By adjusting the tilting spindle drive the first surface can then be tilted about the vertical axis, the point of rotation being the bearing point.

According to a particularly preferred embodiment of the invention, it is provided that the bearing point is in the form of a rotation bearing between the first surface and a second intermediate plate or between the second surface and the said second intermediate plate. Using the second intermediate plate has the advantage that adjustment options or tilting options of the second surface relative to the first surface along further axes are not affected.

In a particularly preferred embodiment of the invention, it is provided that the bearing point is arranged in an outer quarter of the length of the test object holder. Since the bearing point is the point of rotation about which the first surface is rotated, the rotation point as well is correspondingly located in an outer quarter of the length of the test object holder.

Preferably, the bearing point is arranged in an outer quarter of the length of the test object holder remote from the tilting spindle drive. This means that in the longitudinal direction or in the transverse direction the test object holder is divided into four notional quarters, with the bearing point in an outer quarter. This quarter is remote from the other outer quarter, in which the tilting spindle drive is arranged. This has the advantage that owing to the different length ratios of the test object holder around the bearing point, i.e. by reducing the rotation arm, particularly fine tilting adjustment of the side of the second surface remote from the tilting spindle drive is enabled.

In a further preferred embodiment of the invention, it is provided that a set alignment of the second surface relative to the first surface can be fixed by means of clamping screws. Thus, especially during the operation of the drive-train test bench, it can be ensured that no inadvertent alignment change of the test object holder can take place by virtue of vibrations or active forces.

According to a further preferred embodiment of the invention, it is provided that the test object holder also has a base on which the first surface is arranged in such manner that it cannot be displaced or tilted. Thereby, the base enables the test object holder to be arranged at a height essentially suitable for the drive-train test bench. Advantageously, the said base is made from a comparatively rigid, heavy and vibration-damping material, in particular from a mineral casting, which is very suitable for damping vibrations.

The invention also relates to a drive-train test bench for testing an electric vehicle drive system, which comprises a test object holder according to the invention. Thus, the advantages already described in connection with the test object holder according to the invention also apply to the drive-train test bench according to the invention.

BRIEF DESCRIPTION OF THE DRAWINGS

Below, examples of the invention are explained with reference to the embodiments illustrated in the figures.

The figures show.

In all the figures, the same objects, functional units and comparable components are denoted by the same indexes. As regards their technical characteristics these objects, functional units and comparable components are made identically unless stated explicitly or implied by the description.

DETAILED DESCRIPTION

Figures 1, 4:
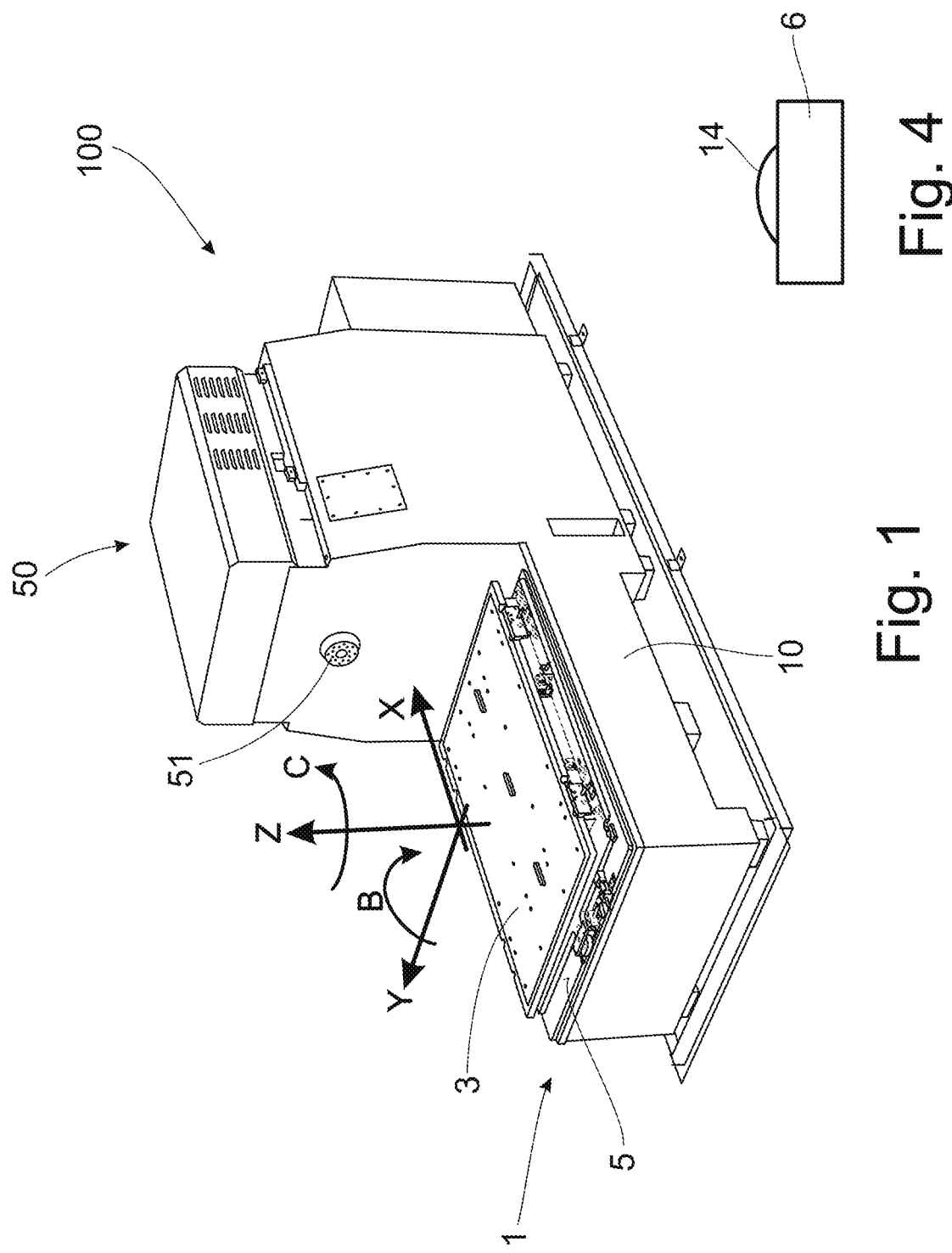
FIG. 1: A possible embodiment of a drive-train test bench according to the invention, illustrated schematically as an example.
FIG. 4: Shown schematically and as an example, the cross-section of a possible embodiment of a convexity formed on one of the two side-edges of a wedge facing toward the second surface 3.

FIG. 1 shows, schematically and as an example, a possible embodiment of a drive-train test bench 100 according to the invention. According to this example, the drive-train test bench 100 comprises a drive module 50 and a test object holder 1 according to the invention. The drive module 50 in this case contains an electric motor (not shown in FIG. 1), which can drive a test object (also not shown in FIG. 1) by way of a flange 51. The test object holder 1 and the drive unit 50 are connected to one another by a common base 10, whereby a particularly rigid and vibration-damping connection is obtained. In this example the base 10 consists of a mineral casting. In addition, the test object holder 1 comprises a first surface 5 and a second surface 3, each made of steel and being arranged one above the other. The first surface 5 is an underside of the test object holder 1 and is arranged on the base 10 in such manner that it cannot be displaced or tilted. By virtue of a number of slots and openings in the second surface 3, a plurality of holding means (not shown) can be arranged in order to hold the test object in position on the second surface 3. The test object holder 1 is designed such that relative to the first surface 5, the second surface 3 can not only be displaced along a longitudinal axis X, a vertical axis Z, and a transverse axis Y, but also tilted relative to the first surface 5 about the vertical axis and the transverse axis. In FIG. 1 the various axes and rotation directions are indicated by the arrows X, Y, Z, B, and C, wherein B shows a rotation about the transverse axis Y and C shows a rotation about the vertical axis Z.

Figures 2A, 2B, 2C, 2D:
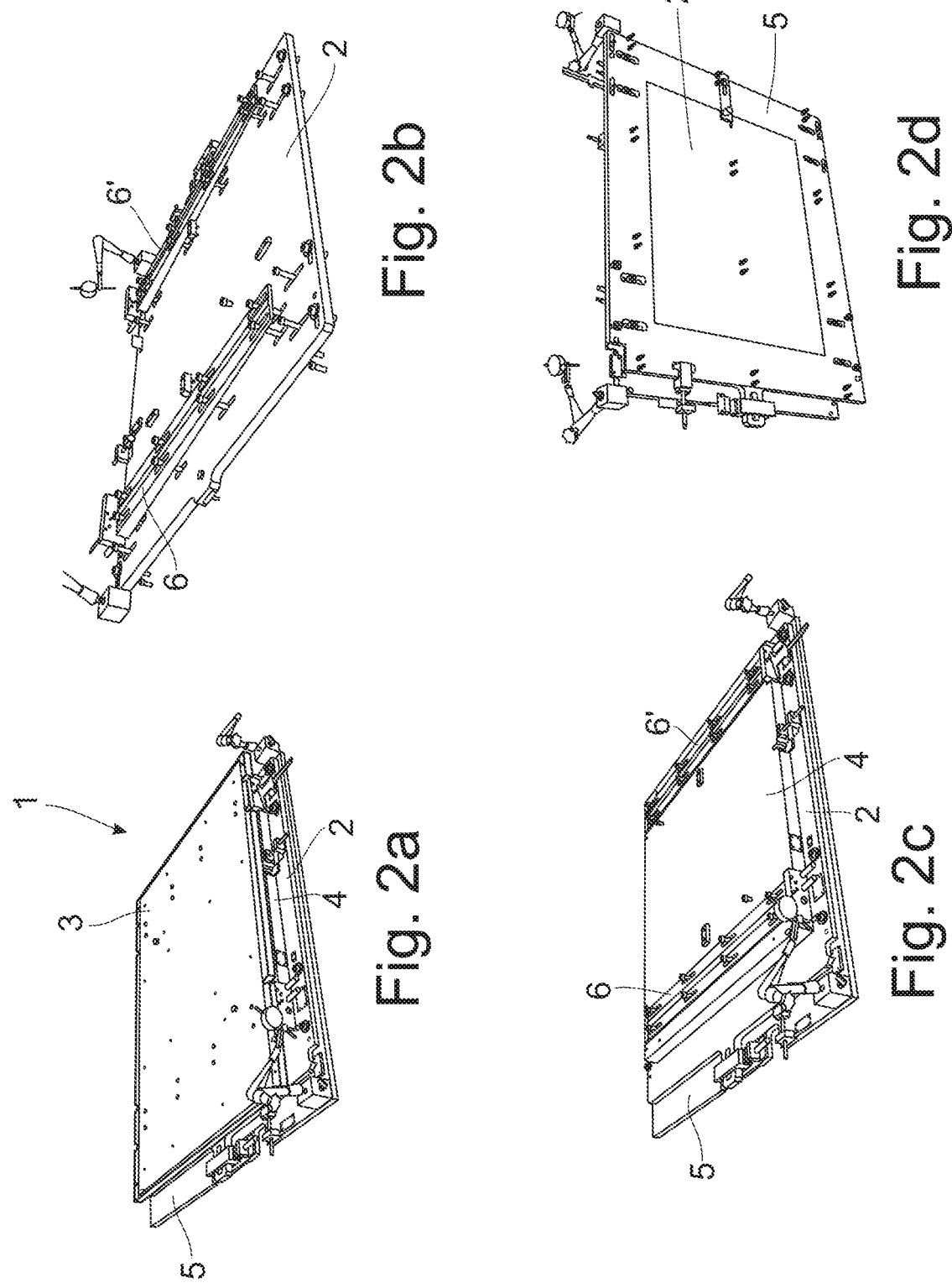
FIGS. 2a-2d: A possible embodiment of a test object holder according to the invention, illustrated schematically as an example.

FIGS. 2a-2d show, schematically and as examples, a possible embodiment of a test object holder 1 according to the invention. FIG. 2a shows a fully assembled test object holder, which comprises a first surface 5, a second surface 3, a first intermediate plate 4, a second intermediate plate 2 and two wedges 6 and 6', wherein in FIG. 2a the wedges 6 and 6' are covered by the second surface 3. FIG. 2b shows only the first surface 2 and the two wedges 6 and 6', which are held onto the first surface 2 by screws. Since the screws pass through slots in the wedges 6 and 6', the wedges 6, 6' can each be displaced along the transverse axis Y. FIG. 2c additionally shows the first surface 5 and the first intermediate plate 4. As can be seen, the second intermediate plate 2 is arranged on the first surface 5. The first intermediate plate 4 distances the wedges 6, 6' from the second intermediate plate 2 without interfering with the mobility of the wedges 6, 6'. Depending on the size of the slots in them, the wedges 6, 6' can be displaced over the surface of the first intermediate plate 4. The second surface 3 is then arranged on the wedges 6, 6' also without restricting the mobility of the wedges 6, 6'. Depending on how far the wedges 6, 6' are displaced, owing to the wedge shape of the wedges 6, 6' the distance between the second intermediate plate 2 and the second surface 3 increases. Thus, the second surface 3 is displaced relative to the first surface 5 along the vertical axis Z. Finally, FIG. 2d shows a view of the test object holder 1 seen from underneath. Due to the particular view chosen, only the first surface 5 and the second intermediate plate 2 can be seen.

Figure 3:
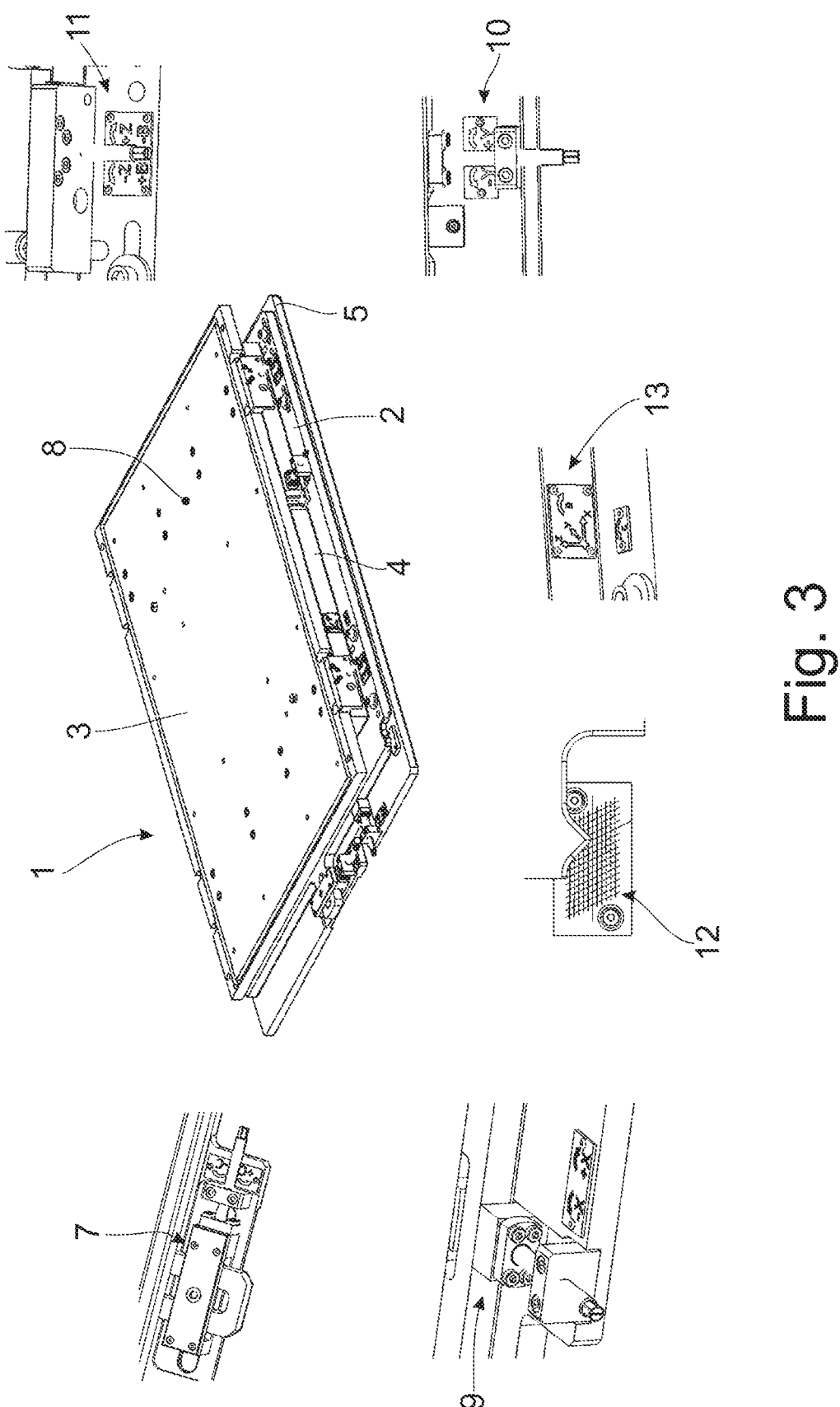
FIG. 3: Another possible embodiment of a test object holder according to the invention, illustrated schematically as an example.

FIG. 3 shows as an example a further possible embodiment of a test object holder 1 according to the invention. In this case, too, the test object holder 1 consists of the first surface 5, the second surface 3, the first intermediate plate 4, the second intermediate plate 2 and two wedges 6 and 6', the wedges 6, 6' again being covered by the second surface 3. In enlarged detail views, FIG. 3 shows a tilting spindle drive 7 for tilting the second surface 3 over the second intermediate plate 2 relative to the first surface 5, around a bearing point 8 about the vertical axis Z, the said bearing point 8 being located in an outer quarter remote from the tilting spindle drive 7 in the longitudinal direction of the test object holder 1. Also, to be seen is a longitudinal spindle drive 9 for displacing the second surface 3 relative to the first surface 5, over the second intermediate plate 2 along the longitudinal axis X. A transverse spindle drive 10 enables the second surface 3 to be displaced relative to the first surface 5, over the first intermediate plate 4 along the transverse axis Y. By means of two wedge spindle drives 11 two wedges 6, 6' can be moved along the transverse axis Y, so that the second surface 3 moves relative to the first surface 5 along the vertical axis Z. By displacing only one wedge 6 or 6' along the transverse axis Y, the second surface 3 can be tilted relative to the first surface 5 about the transverse axis Y. By means of a position indicator 12, a tilt orientation of the second surface 3 relative to the first surface 5 about the vertical axis Z can be determined. Finally, a coordinate display 13 assists an operator of the test object holder 1 in adjusting the test object holder 1, in that the coordinate display makes clear the individual coordinate axes and therefore simplifies the allocation of the spindle drives 7, 9, 10, and 11 to respective displacements along a particular axis or around a particular axis.

FIG. 4 shows, schematically and as an example viewed in cross-section, a possible embodiment of a convexity 14 which is located on a side-edge of a wedge 6 that faces toward the second surface 3 and extends at least in part over the length of the said side-edge. Owing to the convexity 14 there is only a narrow line of contact between the wedge and the second surface 3 which, even in the event of an unintended and only slight lateral rotation or tilting of the wedge 6, does not result in a change of the orientation of the second surface.

INDEXES

1 Test object holder
2 Second intermediate plate
3 Second surface
4 First intermediate plate
5 First surface
6, 6' Wedge
7 Tilting spindle drive
8 Bearing point
9 Longitudinal spindle drive
10 Transverse spindle drive
11 Wedge spindle drive
12 Position indicator
13 Coordinate indicator
14 Convexity
50 Drive module
51 Flange
100 Drive-train test bench
X Longitudinal axis
Y Transverse axis
z Vertical axis
B Rotation about the transverse axis
C Rotation about the vertical axis

The invention claimed is:

1. An adjustable test object holder for a drive-train test bench 100, the test object holder comprising:
a first surface and a second surface parallel to the first surface,
wherein the test object holder is configured to be arranged on a subsurface via the first surface,
wherein a test object is configured to be arranged on the second surface,
wherein the test object holder is configured so that relative to the first surface the second surface can be displaced along a longitudinal axis, a vertical axis, and a transverse axis, and wherein the test object holder is further configured so that relative to the first surface the second surface can be rotated about the vertical axis and tilted about the transverse axis.

2. The test object holder according to claim 1, wherein relative to the first surface the second surface can be displaced along the vertical axis by means of at least two displaceable wedges each having a first long side-edge and a second long side edge opposite the first long side-edge, wherein the first surface is configured to contact the first long side-edge and the second surface is configured to contact the second long side-edge.

3. The test object holder according to claim 2, wherein the at least two displaceable wedges are fixedly arranged on one of the first surface or the second surface, the at least two displaceable wedges are configured to be displaced on another of the first surface or the second surface along an inclined surface so that a displacement of the at least two wedges simultaneously results in an adjustment of the first surface along the vertical axis and about the transverse axis or the longitudinal axis.

4. The test object holder according to claim 2, wherein the at least two displaceable wedges are arranged on a first intermediate plate, the first intermediate plate having an inclined surface on an upper side, which corresponds in an opposite direction to an inclined surface of the at least two displaceable wedges, and wherein an underside of the first intermediate plate is parallel with a long side-edge of each of the at least two displaceable wedges.

5. The test object holder according to claim 2, wherein each of the at least two displaceable wedges has a convexity on a side-edge facing toward the second surface.

6. The test object holder according to claim 2, wherein a position of the at least two displaceable wedges can be determined by means of at least one depth caliper, wherein the at least one depth caliper is used to measure a height of the second surface above the first surface.

7. The test object holder according to claim 2, wherein relative to the first surface the second surface is configured to be tilted about the transverse axis by means of at least one wedge of the at least two displaceable wedges, wherein each of the at least two wedges has a different distance between the first surface and second surface from the other of the at least two displaceable wedges.

8. The test object holder according to claim 2, wherein relative to the first surface the second surface is configured to be tilted about the vertical axis by means of a spindle drive arranged on a long end of the test object holder.

9. The test object holder according to claim 8, wherein the bearing point is in the form of a rotation bearing between the first surface and a second intermediate plate, or between second surface and the second intermediate plate.

10. The test object holder according to claim 8, wherein the bearing point is located in an outer quarter of a length of the test object holder.

11. The test object holder according to claim 1, wherein relative to the first surface the second surface is configured to be adjusted along the longitudinal axis by means of a longitudinal spindle drive, and is configured to be adjusted along the transverse axis by means of a transverse spindle drive, wherein the longitudinal spindle drive is arranged between the first and second surfaces along the longitudinal axis and the transverse spindle drive is arranged between the first and second surfaces along the transverse axis.

12. The test object holder according to claim 1, wherein an orientation of the second surface set relative to the first surface can be fixed by means of clamping screws extending through the at least two displaceable wedges.

13. The test object holder according to claim 1, further comprising a base onto which the first surface is fixed so that the first surface cannot be displaced and cannot tilt.

14. A drive-train test bench for testing an electric vehicle drive system, comprising the test object holder according to claim 1.

15. An adjustable test object holder for a drive-train test bench, the test object holder comprising:

a first surface and a second surface parallel to the first surface in at least some positions of the test object holder; and at least two displaceable wedges fixedly arranged on one of the first surface or the second surface;

wherein the test object holder is configured to be arranged on a subsurface via the first surface, wherein a test object is configured to be arranged on the second surface;

wherein the test object holder is configured so that relative to the first surface the second surface can be displaced along a longitudinal axis, a vertical axis, and a transverse axis;

wherein the test object holder is further configured so that relative to the first surface the second surface can be rotated about the vertical axis and tilted about the transverse axis; and wherein each of the at least two displaceable wedges has a convexity on a side-edge facing toward the second surface that extends over the side-edge.

16. The test object holder according to claim 15, wherein an orientation of the second surface set relative to the first surface can be fixed by means of clamping screws extending through the at least two displaceable wedges.

17. The test object holder according to claim 16, wherein relative to the first surface the second surface is configured to be tilted around a rotation bearing about the vertical axis by means of a tilting spindle drive, wherein the tilting spindle drive is arranged on a long end of the test object holder, the rotation bearing between a second intermediate plate and either the first surface or the second surface.

18. The test object holder according to claim 17, wherein relative to the first surface the second surface is configured to be adjusted along the longitudinal axis by means of a longitudinal spindle drive, and is configured to be adjusted along the transverse axis by means of a transverse spindle drive, wherein the longitudinal spindle drive is arranged between the first and second surfaces along the longitudinal axis and the transverse spindle drive is arranged between the first and second surfaces along the transverse axis.

19. The test object holder according to claim 18, wherein relative to the first surface the second surface is configured to be tilted about the transverse axis by means of at least one wedge of the at least two displaceable wedges, wherein each of the at least two displaceable wedges has a different distance between the first surface and second surface from the other of the at least two displaceable wedges.

20. The test object holder according to claim 19, further comprising a base, wherein the first surface is fixedly secured to the base.

\* \* \* \* \*